United States Patent [19]

Sylla et al.

[11] 4,385,815
[45] May 31, 1983

[54] SLIDE PROJECTOR

[75] Inventors: Jürgen Sylla, Sauerlach-Arget; Hermann Müller, Munich, both of Fed. Rep. of Germany

[73] Assignee: Agfa-Gevaert AG, Leverkusen, Fed. Rep. of Germany

[21] Appl. No.: 309,125

[22] Filed: Oct. 5, 1981

[30] Foreign Application Priority Data

Nov. 27, 1980 [DE] Fed. Rep. of Germany ....... 3044638

[51] Int. Cl.³ .............................................. G03B 23/00
[52] U.S. Cl. ..................................... 353/104; 353/116
[58] Field of Search ............... 353/103, 104, 114, 116, 353/115, 9

[56] References Cited

U.S. PATENT DOCUMENTS

| 2,969,711 | 1/1961 | Robinson et al. | 353/116 X |
| 3,118,341 | 1/1964 | Weiss et al. | 353/116 X |
| 3,178,998 | 4/1965 | King | 353/104 X |
| 3,501,234 | 3/1970 | Johannsen et al. | 353/104 |
| 3,644,031 | 2/1972 | Bennett | 353/104 X |
| 3,953,119 | 4/1976 | Erchoff | 353/116 |

FOREIGN PATENT DOCUMENTS 2914921 10/1980 Fed. Rep. of Germany ...... 353/104

Primary Examiner—Stephen Marcus
Assistant Examiner—William R. Sharp
Attorney, Agent, or Firm—Michael J. Striker

[57] ABSTRACT

A slide projector has a slide exchange element and a slider movable on the latter and having different widths suitable for magazines with different slide compartment widths, wherein the slider is engageable with the slide exchange element under the action of a spring in direction normal to the displacement direction of the slide exchange element, a magazine sensing element senses a magazine inertable into a respective magazine path and provides for disengagement of the slider from the slide exchange element, and an abutment slides in the displacement path of the slider in the disengaged position of the same.

13 Claims, 3 Drawing Figures

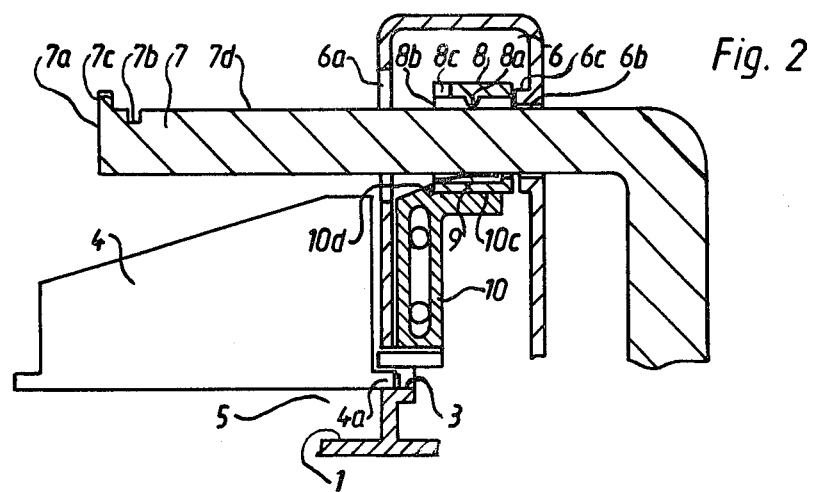
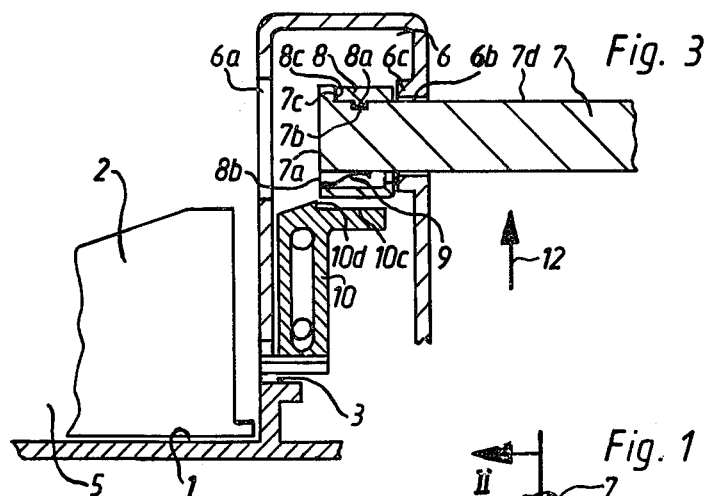
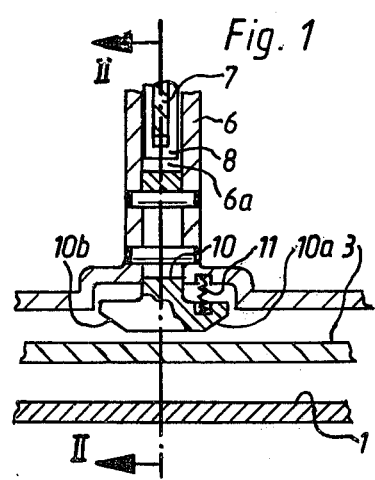

SLIDE PROJECTOR

BACKGROUND OF THE INVENTION

The present invention relates to a slide projector. More particularly, it relates to a slide projector which has a slide exchange element and a slider movable over the latter.

Slide projectors of the above-mentioned general type are known in the art. In a known slide projector for framed slides magazines of different types which distinguish from one another by different slide compartment widths can be arranged; a slide exchange element which is actuated by a motor or by hand and a device for stepped transport of the inserted magazine by one slide compartment width after returning of the projected slide into the magazine, are provided. The slide exchange element has a portion which is insertable into and withdrawable from a magazine for slide transport and takes along a central one from three slides. The width of this portion of the slide exchange element is smaller than the distance between one slide and a neighboring slide in the magazine with a smaller slide compartment width. The slider which is movable in slide exchange element transport direction in the above-mentioned portion of the latter and on the end edge of the slide exchange element, has a width which is greater than the width of the slide exchange element or its end edge. At the same time, the width of the slider is smaller than the distance between one slide and a neighboring slide in the magazine with a greater slide compartment width. This slide projector is described, for example, in the German Patent Application P No. 2,849,361.0. This construction, however, does not provide automatical assumption by the slider such a position on the slide exchange element which corresponds to the used magazine type.

SUMMARY OF THE INVENTION

Accordingly, it is an object of the present invention to provide a slide projector which avoids the disadvantages of the prior art.

More particularly it is an object of the present invention to provide a slide projector in which a slider automatically assumes a position on a slide exchange element which corresponds to the used magazine type.

In keeping with these objects and with others which will become apparent hereinafter, one feature of the present invention resides, briefly stated in that a slider movable over a slide exchange element is engageable with an end section of the latter under the action of a spring and can be disengaged by a magazine sensing element which extends into a magazine path of a magazine of one type when this magazine is in its magazine path, and an abutment is provided which in disengaged position of the slider lies in its displacement path.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a view showing an inventive slide projector, and particularly its parts which are important for the invention, parallel to a magazine path;

FIG. 2 is a view showing a section taken along the line 2—2 in FIG. 1, with the use of a magazine with a smaller slide compartment width; and FIG. 3 is a view corresponding to the view of FIG. 2 without the magazine or with a slide magazine with a greater slide compartment width.

DESCRIPTION OF THE PREFERRED EMBODIMENTS

A slide projector has a magazine guiding path 1 which is formed as magazine shaft bottom 1 and is suitable for insertion of a so-called unit magazine 2 with a relatively great slide compartment width. It also has a magazine guiding path 3 located above the first-mentioned magazine guiding path and formed by steps or grooves. A second magazine type 4 with a smaller slide compartment width is insertable by its lateral longitudinal ribs 4a over or into the magazine guiding path 3.

The magazine guiding paths have a magazine shaft 5 and are provided at their side facing away from not shown projector objective and lamp housing or a slider receptacle, with a hollow housing part 6. The housing part 6 has two openings 6a and 6b. A transport arm 7 of a hand or motor movable slide exchange element is guided or controlled in the above-mentioned openings 6a and 6b. The opening 6b which faces away from the shaft 5 or the guiding paths 1 and 3 is so big that the transport arm 7 can move through the same. This opening carries at its inner side a collar 6c which forms an abutment for a slider 8 which moves along the transport arm 7. Thereby, the slider 8 during the displacement of the transport arm 7 or the slide exchange element from the shaft 5 cannot be withdrawn from the housing part 6. The opening 6a, in contrast, is so big that the slider 8 can move through the opening 6a together with the transport arm 7 in at least in its engaged position with the transport arm 7 as can be explained hereinbelow.

The slider 8 embraces the transport arm 7 in an O-like manner and is provided with a coupling claw 8a extending in a direction normal to the movement of the slide exchange element 7. The coupling claw 8a can engage in a coupling recess 7b which is located near a slider element end face 7a. The coupling recess 7b is so located that the coupling claw 8a can spring or engage into the same in the event when an end side 8b of the slider coincides with the end side 7a of the transport arm 7. A recess 8c is provided in the slider 8 and extends in the displacement direction at its end side 8a facing toward the magazines. Abutment tongues 7c at the end side of the transport arm engage in the recess 8c for fixation of the end sides 7a and 8b when a coupling claw 8a falls into the coupling recess 7b. Because of the abutment tongues 7c and the recess 8c it is attained that the opening 6b or its collar 6c serves directly via the slider 8 as a movement limit for the transport arm 7 or the slide exchange element in its position extending from the housing part 6.

The inner hollow space of the slider 8 is higher than the height of the transport arm 7, so that by displacement of the slider 8 normal to the transport direction of the transport arm 7 upwardly and parallel to the same, the coupling claw 8a moves out of engagement with the coupling recess 7b and can lie over an upper edge 7d of the transport arm 7 or on the latter, as can be seen from FIG. 2.

The width of the transport arm 7 is so selected that it can move between three slides in a magazine 4 with the smaller slide compartment width and can transport the central one of the three slides into a slide receptacle and back into the magazine 4. The width of the end side 8b of the sliders 8 is, in contrast, so dimensioned that the transport arm 7 with end sided slider 8 can move in between the three slides in a magazine 2 with a greater slide compartment width and thus transport the central slide and thereby provide for a reliable transport of a thinner slide in the respective magazine 2. A spring 9 is arranged between the slider 8 and the transport arm 7, preferably mounted on the slider 8. This spring presses the slider in its engaged position with the transport arm 7. When the slider 8 is disengaged, it is prestressed in accordance with FIG. 2. When the slider 8 is released and moved to a position in which the coupling claw 8 falls into the coupling recess 7b, the spring is unloaded and engages the slider 8 and the transport arm 7 in their end side operating position, as can be seen in FIG. 3.

In order to provide for engaging and disengaging of the slider 8 on the transport arm 7 automatically in dependence upon the type of the magazine 4 or 2 inserted into the magazine shaft 5, a magazine sensing element 10 is provided. The magazine sensing element 10 engages under the action of a spring 11 into the guide path 3 for the magazine 4 with a smaller slide compartment width. It has two inclined faces 10a and 10b which are inclined opposite to one another in magazine longitudinal direction. When the magazine 4 or its ribs 4a is inserted into the magazine guiding path or groove 3, its end side moves the magazine sensing element 10 against its associated inclined surface 10a or 10b upwardly in direction of the arrow 12 with tensioning of the spring 11. A slider facing surface 10c of the magazine sensing element 10 has a projection 10d. The magazine sensing element 10 is so located that its surface 10c in the extended position of the transport arm 7 in FIG. 3 is located exactly below the slider 8, and its projection 10d is located at the magazine side of the slider 8.

When in correspondence with FIG. 2, the magazine 4 is inserted into the magazine guiding path 3, its end side presses against one of the inclined surfaces 10a and 10b of the magazine sensing element 10 in the direction of the arrow 12 so that its surface 10c lifts the slider 8 against the action of the spring 9 and disengages the slider 8 from the transport arm 7. The projection 10d lies at the magazine side in front of the slider 8, so that the slider 8 during movement of the transport arm 7 or the slide engage element is no longer taken along therewith and lies with its coupling claw 8a over the upper edge 7d of the transport arm 7. The transport arm 7 transports correspondingly with its smaller end side the narrowly arranged slides in the magazine 4 with the smaller slide compartment width.

When the magazine is removed from the guiding path 3, the magazine sensing element 10 is released and pressed under the action of the spring 11 again into the guiding path 3. The coupling claw 8a lies so long on the upper edge 7d of the transport arm 7 until the latter assumes its extended position of FIG. 3 and the coupling 8a again springs into the coupling recess 7b with unloading of the spring 9. Thereby, the position shown in FIG. 3 is again attained, which is suitable for the magazine 2 with the greater slide compartment width.

In accordance with the shown embodiment, the magazine sensing element 10 is formed as a slider movable in the direction of the arrow 12 normal to the magazine guiding paths. It can also be formed as a lever whose one arm moves in the hollow space of the housing part 6 and the other arm pivots upwardly against the slider 8. It is also possible instead of the projection 10d on the magazine sensing element 10 to provide the second opening 6a so big and arrange in such a manner that the slider 8 in its engaged position can extend through the same, and in its disengaged position abuts against the inner wall of the housing part 6 near the opening 6a. In this case, the inner space of the housing part 6 must be no longer than the slider 8 in order to guarantee an automatic disengagement. It is also possible in addition to the projection 10d to provide an abutment formed by the collar 6c. It is also possible to provide such an arrangement in which the spring 9 acts in disengaging direction and the magazine sensing element 10 extends into the guiding path 1 for the magazine with greater slide compartment width, and upon insertion of the magazine 2 the slider 8 is resiliently engaged on the transport arm 7.

It will be understood that each of the elements described above, or two or more together, may also find a useful application in other types of constructions differing from the types described above.

While the invention has been illustrated and described as embodied in a slide projector it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A slide projector for framed slides arranged in magazines of at least two different types having different slide compartment widths, the slide projector comprising a slide exchange element for a first magazine with a smaller slide compartment widths and having a portion insertable into and withdrawable from the first magazine in a slide exchange element displacement direction so as to take along a central slide from three slides, said portion of said slide exchange element having a width which is smaller than a distance between one slide and a neighboring slide in the first magazine with the smaller slide compartment width; a slider for a second magazine with a greater slide compartment width and movable on said portion of said slide exchange element in said displacement direction over a predetermined path, said slider having a width which is greater than the width of said slide exchange element and smaller than a distance between one slide and a neighboring slide in the second magazine with the greater slide compartment width, said slider being spring-engageable with said portion of said slide exchange element in a direction normal to said displacement direction; means forming two magazine paths each for a respective one of the magazines; a magazine sensing element extensible into one of said magazine paths for a respective one of the magazines and displaceable upon insertion of the one magazine in said one magazine path so as to disengage said slider from said portion of said slide exchange element; an abutment arranged to lie in the movement path of said slider upon insertion of said one magazine in said one magazine path and in the disengaged condition of said slider so as to retain the latter, and to lie out of the movement path of said slider upon insertion of said other magazine in said other magazine path and in the engaged position of said slider so as to release the latter; and spring means arranged to urge said slider into engagement with said portion of said slide exchange element.

2. A slide projector as defined in claim 1, wherein said slide exchange element is a hand-operated element.

3. A slide projector as defined in claim 1, wherein said portion of said slide exchange element is arranged so that said slider moves thereover and has a predetermined width, the width of said slider being greater than the width of said portion of said slide exchange element.

4. A slide projector as defined in claim 1, wherein said magazine paths extend in predetermined planes, said slider being movable normal to said magazine paths planes.

5. A slide projector as defined in claim 1, wherein said magazine sensing element is arranged so that in the absense of the one magazine in said one magazine path it displaces and allows said slider to disengage from said portion of said slide exchange element.

6. A slide projector as defined in claim 1, wherein said abutment is provided on said magazine sensing element.

7. A slide projector as defined in claim 1, wherein said spring means includes a slider spring.

8. A slide projector as defined in claim 1, wherein the magazines are transportable in a magazine transport direction, said magazine sensing element being arranged in the one magazine path for the one magazine with smaller slide compartment width and having surfaces which are inclined in opposite directions relative to the magazine transport direction so that upon insertion and movement of the one magazine, the magazine sensing element is lifted on said inclined surfaces in the one magazine path.

9. A slide projector as defined in claim 8, wherein said slider surrounds said slide exchange element in O-like manner, said slide exchange element having a recess, and said slider having an engaging claw engageable in said recess, and also disengageable from said recess when said magazine sensing element is in its lifted condition.

10. A slide projector as defined in claim 1, wherein said magazine sensing element has a face cooperating with said slider and is provided at said face with a projection which forms said abutment.

11. A slide projector as defined in claim 1, wherein said slide exchange element has an abutment tongue; said slider having an end side facing toward the magazines and being provided at said end side with a recess in which said abutment tongues of said slide exchange element engage.

12. A slide projector as defined in claim 1; and further comprising a hollow housing part guiding said slide exchange element.

13. A slide projector as defined in claim 12, wherein said hollow housing part has a side facing away from said magazine path and is provided with an opening which is smaller than said slider, said housing part having a side facing toward said magazine paths and provided with a further opening with dimension and position allowing said slider to move therethrough at least in its engaged condition.

* * * * *